Patented Dec. 12, 1950

2,533,911

UNITED STATES PATENT OFFICE 2,533,911

ENAMEL AND METHOD OF PREPARING THE SAME

Henry A. Bates, Chicago, Ill., assignor to Continental Can Company, Inc., New York, N. Y., a corporation of New York No Drawing. Application February 10, 1945, Serial No. 577,348

6 Claims. (Cl. 260—19)

This invention relates to a coating composition and to a method for preparing the same. More particularly, it relates to a coating composition adapted to be used for lining metal containers for foods.

Clear unpigmented oleoresinous type protective coating compositions for lining metal food containers, such as tin cans, which have heretofore been known, have suffered from the disadvantage that their resistance to acids in the presence of water and oxygen is poor. Thus, when tin cans lined with these compositions are packed with aqueous acid foods, the part of the lining which is above the surface of the product in the container is attacked by the air, acid and water present, particularly at the temperatures normally used in processing canned foods, and as a result of this attack the coating composition is caused to lose adhesion and peel off in such areas. The worst loss of adhesion and blistering and peeling of the coating composition occurs when the same part of the container lining is above the surface of the product during both processing and storage. When the part of the lining which is above the surface of the product during processing is below the surface during storage, slightly less loss of adhesion and blistering and peeling occurs. When a part of the lining not above the surface during processing is above the surface during storage, a considerably less tendency to failure is noted because the attack is far more severe at elevated temperatures, but some may still occur after long storage periods. The air in the headspace is a determining factor in the loss of adhesion, blistering and peeling of the coating composition and cannot be eliminated in commercial canning practice, and therefore coating compositions resistant to such loss of adhesion, blistering and peeling with aqueous acid food products are highly desirable.

It is an object of the present invention to provide an oleoresinous type protective coating composition for lining metal containers for foods which composition shows improved resistance to peeling where the containers are filled with aqueous acid foods and stored.

Unexpectedly, it has now been found that by cooking a drying oil and a varnish resin in the presence of a small amount of zinc oxide until an oleoresinous varnish base solution is obtained which forms clear films, the resulting coating composition does not lose adhesion and blister and peel with aqueous acid products. The precise action which takes place during the cooking is not known but it is known that the product is distinct from that resulting from the admixture of an equal amount of zinc oxide with a cooled solution of an oleoresinous varnish base which has been prepared in the same manner save for the presence of the zinc oxide during the cooking. Such coating compositions which contain free zinc oxide form a somewhat hazy film which is attacked by aqueous acids as described above with a resulting loss of adhesion, blistering and peeling. It has also been observed that this new coating composition prevents loss of adhesion, blistering and peeling with products containing organic acids such as meats and meat products. Coating compositions normally used for non-aqueous fatty acid containing products such as meats contain relatively large quantities of zinc oxide added after cooking and thinning form films which are translucent and which are susceptible to attack by the acids in aqueous acid products with a resulting disintegration of the film.

As a specific example of practice, 100 pounds of an oil-soluble resin modified phenol-formaldehyde resin having an acid number of 12 to 18 having a softening point of 145–155° C., a melting point (ring and ball) of 161–169° C., a specific gravity of 1.07, a viscosity of 13.0 (56% toluol), and dissolving completely in oil at 400° F., was mixed with 160 pounds of bodied dehydrated castor oil having an acid number of 3 to 6 and 2.3 pounds of zinc oxide, and heated to 580 degrees F. with agitation in 40 minutes' come-up time and 40 minutes' holding time. The reaction product had a viscosity at 560–580 degrees F. of about 8–11 seconds with a Zahn No. 3 viscosity dip cup. The product was cooled by water to 450 degrees F. in 10 minutes, and then reduced by mixing with 270 pounds of mineral spirits as a volatile thinner. 3.2 pounds of liquid drier containing manganese naphthenate (0.2 pound of manganese) was added as a drier.

This coating composition can be applied to tin plate by brushing, spraying, roller coating, etc., dried and baked for example, at 375–425° F. Containers having their interior surfaces thus covered and employed for packaging acid foods, for example, tomato juice, fruits, pickles, etc. exhibit an excellent resistance against peeling in the headspace during processing and after storage and the coating composition remains tightly adherent to the container wall.

The resin component is selected from oil-soluble varnish resins for example, the rosin modified phenolics (phenol-aldehyde) resins, (e. g. a rosin-modified phenol-formaldehyde resin having a softening point of 118–125° C., a melting point (ring and ball) of 142–149° C., an acid number of 11–20, specific gravity 1.10, viscosity 3.8, and dissolving completely in oil at 400° F.; or a rosin-modified phenolic resin of melting point 148–158° C. (mercury method), acid number 12–18, completely soluble at ratio 1:1 in coal-tar hydrocarbons and the usual varnish oils, and partially soluble in mineral spirits and insoluble in ethyl alcohol) rosin modified maleic-glycerol alkyd resins (e. g. a resin having a softening point of 95–100° C., melting point of 122–126° C., acid number 20–35, specific gravity 1.13, viscosity 0.7, and dissolving completely in oil at 370° F.; a similarly constituted resin having a melting point of 230–248° F., acid number 22–28, specific gravity 1.14–1.18 in various lots, a rosin-modified maleic-glycerol alkyd resin with an acid number around 30; etc.) esterified natural resins, such as glycerol esterified copals, oil soluble hydrocarbon resins obtained from polymerization of olefin-diolefin fractions of cracked petroleum distillates.

The esterified copals have been used as cook controlling agents in making oleoresinous varnish bases to slow the rate of bodying of the drying oil and these and other resins having similar properties may be so employed in making the compositions of the present invention for example, to permit the zinc oxide to be reacted without excessive bodying of the oil.

Instead of bodied dehydrated castor oil as used in the above examples other drying oils which, like the bodied dehydrated castor oil, contain an average of at least two double bonds in an acid radical may be used. Examples of drying oils of this group are China-wood oil, oiticica oil, maleated oils, such as maleated linseed oil, phenolized oils, dehydrated oils (dehydrated castor oil used in detailed example), drying oils isomerized to increase the proportion of conjugated double bonds, such as alkali-isomerized linseed oil, drying oils in which at least a portion of the acids are esterified with such polyhydroxy compounds as mannitol, sorbitol and pentaerythritol, such as mannitol esters of linseed oil acids for example, the oil product which is a sorbitol ester of virgin linseed oil fatty acids in which about 4.5–4.8 of the sorbitol OH groups are esterified, faster drying oil fractions segregated from slower drying oil mixtures, by splitting, solvent extraction or distillation, such as a fast drying fraction segregated from linseed oil by solvent extraction, acetylated oils, such as acetylated oiticica oil and heat-treated linseed oil. The drying oil preferably should have an acid number greater than about 1 or better yet at least 3.

The coating compositions described herein differ from each other in much the same manner, depending upon the drying oil and varnish resin used, as do oleoresinous compositions cooked in the absence of zinc oxide so that those skilled in the art will be able to select combinations of drying oils and varnish resins to obtain desired properties along with the superior resistance to peeling, better adhesion and resistance to fatty acids characteristic of the oleoresinous coating compositions cooked with zinc oxide as described herein. In accordance with known principles the resin and drying oil should be chosen so that, for example, the resin is soluble in, compatible with, and reactive at cooking temperature with the drying oil whereby a homogeneous oleoresinous varnish base is obtained. As is well known the oil is characterized by having double bonds in the molecule whereby polymerization is initiated during the bodying and cooking, and the cooking of the oleoresinous varnish base is terminated prior to complete polymerization, so that the final baking of the coated article includes further polymerizing action in the base.

The ratio of resin to drying oil may be adjusted in accordance with the known principles to obtain from the selected resin and oil a product having a particular set of properties. The preferred ratios of resin to drying oil to be used in making protective coating compositions as disclosed herein are from 100:160 to 100:100, with corresponding change in the viscosity of the product under given conditions of cooking and thinning. Both higher and lower ratios, for example, down to 100:240 and lower, may, however, be used.

The quantity of zinc oxide is proportioned to the combined weight of the resin and the drying oil, and is from ½ to 2½ percent thereof. It has been found that about 1.0 percent on the same basis gives an excellent result.

Other driers may be substituted for that given in the above example. When an increase in the rapidity of drying and baking is not of critical importance the drier may be omitted.

While the cooking temperature employed in the above example is preferred to ensure reaction of all the zinc oxide, as evidenced by the formation of a clear solution, this temperature may be varied both above and below 580° F. In general, a minimum temperature of 540° F. is preferred to cause the zinc oxide to react and rather than employ the minimum it is still better to cook at a temperature above 540° F. and to maintain the composition above this temperature for at least about 6 to 8 minutes to react all of the zinc oxide. Thereafter, the cooking may be conducted as desired to obtain the required body. Usually the time of cooking above 540° F. to obtain the desired body will exceed 6 to 8 minutes and this will determine the length of cook at this temperature. The particular cooking conditions used in the above example were also determined in part by the size of the batch which is always a factor. Thus as the batch size is varied cooking conditions also vary due to heat transfer conditions in the mass being heated. For example, in small laboratory batches a much shorter come-up time is satisfactory.

In comparing coatings on tin plate cans prepared by baking the enamel of the foregoing specific example, with those prepared from an enamel likewise made by cooking the same relative amounts of the same resin and the same drying oil, with the same cooking times and temperatures, but employing 290 parts of the same thinner (to compensate for a slightly greater cold viscosity), it was found that all containers under accelerated oxygen-spinach test exhibited no peeling when coated with the new enamel, whereas the comparison cans coated with the enamel cooked in the absence of the zinc oxide showed over 50 percent of peels from the top of the can. In a further comparison, the introduction of zinc naphthenate to the compared enamel, in the various ranges of metal content feasible, did not increase the adhesion factor effectively.

It is obvious that the invention is not limited to the specific form of practice described, and that it may be practiced in many ways within the scope of the appended claims.

I claim:

1. The method of preparing an adherent oleoresinous baking lacquer composition for coating metal which comprises cooking 100 parts by weight of an oil-soluble varnish resin with substantially 100 to 240 parts of a drying oil having an average of at least two double bonds in an acid radical, said varnish resin having an acid number of about 12 to 18 and said drying oil having an acid number of at least 1, in the presence of zinc oxide in the proportion of about 0.5% to 2.5% of the combined weight of the resin and oil, at least until the zinc oxide has reacted, terminating the cooking when the viscosity is substantially 8 to 11 seconds with a #3 Zahn Cup, and while the product is still soluble in mineral spirits, and then thinning with a volatile solvent.

2. The method of preparing an adherent baking lacquer for coating metal, which comprises heating substantially 100 parts, by weight, of an oil-soluble rosin-modified phenol-aldehyde varnish resin with 160 parts, by weight, of bodied dehydrated castor oil and substantially 2.3 parts, by weight, of zinc oxide at substantially 560 degrees F. and holding until a viscosity of substantially 8 to 11 seconds with a #3 Zahn Cup is attained, terminating the heating while the product is still soluble in mineral spirits, cooling to substantially 450 degrees F., and diluting with mineral spirits.

3. A baking lacquer coating composition comprising as an oleo-resinous base the product of cooking an oil-soluble varnish resin with a drying oil having an average of at least two double bonds in an acid radical, the ratio of resin:oil being between 100:100 and 100:240, said varnish resin having an acid number of about 12 to 18 and said drying oil having an acid number of at least 1, in the presence of zinc oxide in the proportion of about 0.5 to 2.5 percent of the combined weight of the resin and oil until the zinc oxide has reacted, and terminating the cooking when the material has a viscosity of substantially 8 to 11 seconds with a #3 Zahn Cup and while the product is still soluble in mineral spirits.

4. A coating composition comprising the solution in mineral spirits of a oleoresinous reaction product of a drying oil containing an average of at least two double bonds in an acid radical and an oil-soluble varnish resin, heated together at a temperature above about 540 degrees F. for at least 6 to 8 minutes, in the resin:oil ratio of substantially 100:100 to 100:240 parts, by weight, said varnish resin having an acid number of about 12 to 18 and said drying oil having an acid number of at least 1, and in the presence of about 1 percent of zinc oxide based on the combined weight of the oil and resin, said cooking having been terminated when the viscosity is substantially 8 to 11 seconds with a #3 Zahn Cup and while the product is still soluble in mineral spirits.

5. The method of preparing an adherent oleo-resinous baking lacquer composition for coating metal which comprises cooking 100 parts by weight of an oil-soluble varnish resin with substantially 100 to 240 parts of a drying oil having an average of at least two double bonds in an acid radical, said varnish resin having an acid number of about 12 to 18 and said drying oil having an acid number of at least 1, in the presence of zinc oxide in the proportion of about 1 percent of the combined weight of the resin and oil, at least until the zinc oxide has reacted, terminating the cooking when the viscosity is substantially 8 to 11 seconds with a #3 Zahn Cup, and while the product is still soluble in mineral spirits and then thinning with a volatile solvent.

6. A baking lacquer coating composition comprising as an oleo-resinous base the product of cooking an oil-soluble varnish resin with a drying oil having an average of at least two double bonds in an acid radical, the ratio of resin:oil being between 100:100 and 100:240, said varnish resin having an acid number of about 12 to 18 and said drying oil having an acid number of at least 1, in the presence of zinc oxide in the proportion of about 1 percent of the combined weight of the resin and oil until the zinc oxide has reacted, and terminating the cooking when the material has a viscosity of substantially 8 to 11 seconds with a #3 Zahn Cup and while the product is still soluble in mineral spirits.

HENRY A. BATES.

REFERENCES CITED

The following references are of record in the file of this patent:

UNITED STATES PATENTS

| Number | Name | Date |
| --- | --- | --- |
| 2,152,633 | Catlow et al. | Apr. 4, 1939 |
| 2,207,997 | Courtney | July 16, 1940 |

OTHER REFERENCES

"Industrial Solvents," by I. Mellan, page 121, published in 1939 by the Reinhold Publishing Corporation.